Feb. 13, 1968     TATSUO ASAMAKI ET AL     3,368,818

VACUUM FLANGE

Filed Feb. 2, 1965

INVENTORS
TATSUO ASAMAKI
TETSUO DAIROKUNO
BY
Hopgood & Calimafde
ATTORNEYS 3,368,818
VACUUM FLANGE
Tatsuo Asamaki and Tetsuo Dairokuno, Tokyo, Japan, assignors to Nippon Electric Company Limited, Shiba Minatoku, Tokyo, Japan
Filed Feb. 2, 1965, Ser. No. 429,794
Claims priority, application Japan, Feb. 2, 1964, 39/10,955
2 Claims. (Cl. 277—9)

ABSTRACT OF THE DISCLOSURE

An improved mechanical seal for vacuum systems in high temperature applications. A flange-gasket type seal is provided with an annular channel through which non-oxidizing gas is circulated to prevent buildup of oxidation on the surfaces of the seal forming parts.

---

This invention relates to metallic flange seals, and particularly to all-metal vacuum flanges for maintaining a tight vacuum at the seal.

Vacuum flanges of the all-metal type are disclosed in an article, "Ultra-High Vacuum Flanges," by W. R. Wheeler and M. Carlson, at page 1309 of the publication, "Transactions of the Eighth National Vacuum Symposium." Those knowledgeable in the art, however, will know that still other types of all-metal vacuum flanges besides those discussed in this article were known before publication thereof. Among these, the Conflat flange, which is also described in the article referred to, is considered the best from the standpoint of heating cycle resistance. However, the performance of this flange at high temperatures, such as around 500° C. and above, is so poor that a satisfactory leak test ordinarily cannot be obtained. A still further disadvantage of the Conflat flange construction is that the flanges, gaskets and air tight surfaces tend to become oxidized.

Accordingly, it is an object of this invention to provide a flange which is novel and economical and which substantially eliminates the above-mentioned defects.

Figure 1:
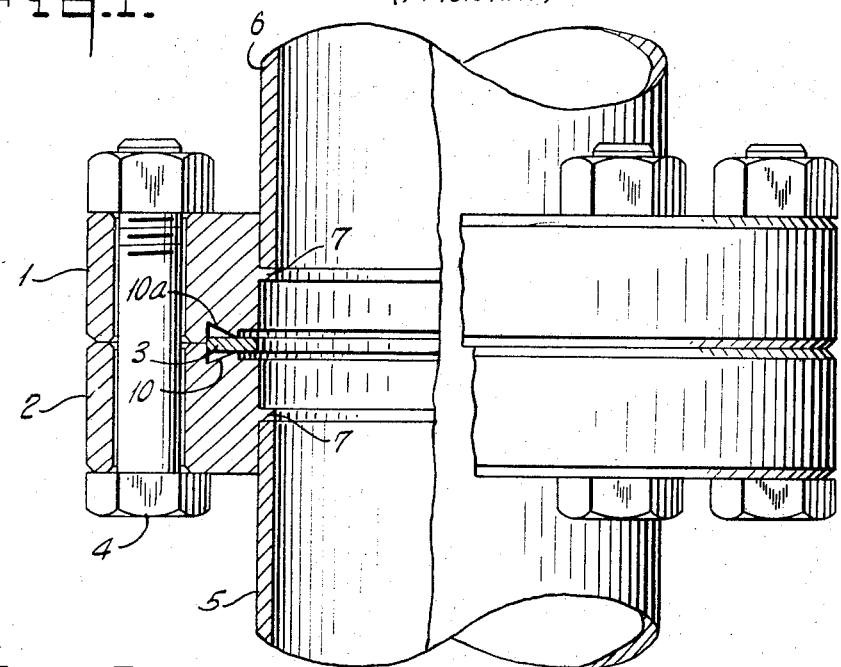
Figure 2:
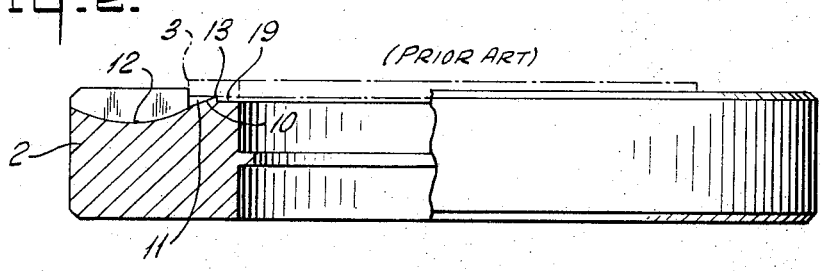
Figure 3:
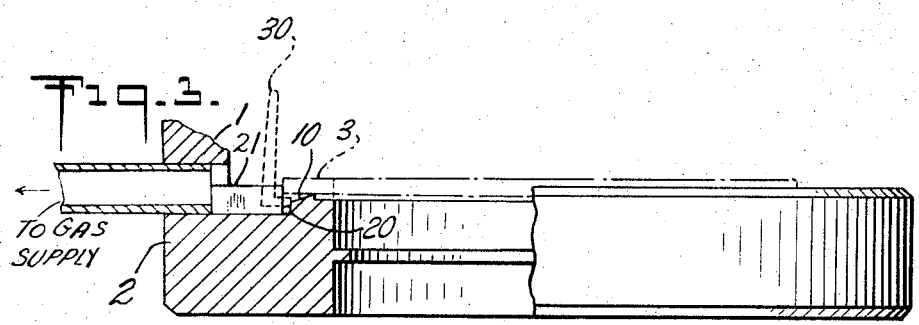

All of the objects, features and advantages of this invention and the manner of attaining them will become more apparent and the invention itself will be best understood by reference to the following description of an embodiment of the invention taken in conjunction with the accompanying drawing in which FIG. 1 is a front view partly in section of a conventional vacuum flange construction, FIG. 2 is a front sectional view of one-half of another conventional flange, and FIG. 3 shows a sectional front view of one-half of a flange constructed according to one embodiment of the present invention.

In FIG. 1 there is shown one construction of the conventional Conflat type flange, in which the numerals 1 and 2 indicate paired flanges, and which maintain an air tight seal by reason of conical surfaces 10 and 10a, which clamp a heat-resistant gasket 3, by means of a bolt-nut combination 4, until it expands into the region adjacent these conical surfaces. The gasket 3 may be made of any suitable material, such as a comparatively soft metal as copper or the like, for example. The numerals 5 and 6 denote metal tubes, such as stainless steel, and are connected from one vacuum device to another. These metal tubes and the respective flanges are welded, by means of argon arc welding, for example, at the portions 7.

FIG. 2 shows another example of a conventional flange construction, in which a groove 12 several millimeters in width is made on the flange to provide a leak-proof seal at the gap 11 when a suitable connection is made to this part. In this figure, the gap 11 becomes extremely narrow and is not suited for circulation of a fluid, such as for example, gas. Particularly at high temperatures, the gap 11 becomes stopped up with oxidized substances from the flanges, gaskets and other parts and as a result it becomes impossible to circulate the fluid. Furthermore, this creates such a difficult situation that removal of the gasket must be accomplished from the direction of the side 19 and this is difficult to do without also impairing the projection 13 on the sealing surface 10.

These and other disadvantages of prior art construction are substantially eliminated by the construction of the invention, one embodiment of which is shown in FIG. 3. In this figure, a circumferential groove or channel 20 is provided along the conical air tight surface 10. A gas entry groove or channel 21 is further provided in the flange 2 to connect the groove 20 with a suitable external gas supply. A suitable gas exit groove or channel may also be provided. Thus it will be appreciated that with this construction, oxidation of the flange and gasket due to operation at high temperatures, can be avoided by circulation of gas, such as, for example, nitrogen, in the grooves 20 and 21, thereby protecting the flange, gasket and sealing surfaces from chemical contamination. Furthermore, the gasket can be removed easily from the groove 21 by means of a suitable tool, such as the hook shaped member 30.

In the above embodiment, various shapes and positions of the grooves 20 and 21 are possible and various methods may be employed for the clamping of the gasket 3. Furthermore, the air tight surfaces need not necessarily be conical, since various other configurations, such as for example, pyramidal surfaces, may also be satisfactorily employed.

The improved vacuum tight seal of this invention provides several important advantages. Thus a much better seal is provided, as indicated by more satisfactory leakage test results. Also, it is now possible to adequately protect the gasket and flanges by continuously providing a chemically stable gas at the vacuum tight surface. Further, a vacuum tight condition can be maintained for a long period of time, even at high temperatures, and consequently, the life of the flange can be prolonged because the important parts, such as the vacuum tight surfaces, will not be impaired as in prior constructions.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An improved all-metal vacuum-tight seal comprising first and second flange members,
   a heat resistant gasket, said gasket being held in a squeezed condition between said flanges to provide a vacuum tight seal therebetween,
   at least one peripheral channel adjacent said gasket for the flow of a non-oxidizing gas therethrough, said peripheral channel being bounded by a portion of said gasket and a portion of at least one of said flanges, said peripheral channel having an inner boundary wall on said one flange which has a smaller diameter than said gasket to form a recess adjacent said gasket wherein a tool may be inserted to pry said gasket away from one of said flanges during disassembly,
   and a channel in said one flange for connecting said peripheral channel to a source of said gas to force the same through said peripheral channel, whereby oxidation of said gasket and flanges at high temperatures is avoided by reason of a reduced impedance to the flow of said gas through said flange members.

2. The invention described in claim 1 wherein said gasket is made of a metal-like material that is more malleable than the material of which said flanges are made.

References Cited
UNITED STATES PATENTS

| | | | |
|---|---|---|---|
| 2,760,673 | 8/1956 | Laurent | 277—72 X |
| 3,143,240 | 8/1964 | Crocker | 277—22 X |
| 3,211,478 | 10/1965 | Batzer | 277—236 X |

SAMUEL ROTHBERG, *Primary Examiner.*